(12) United States Patent
Lee

(10) Patent No.: US 8,072,445 B2
(45) Date of Patent: Dec. 6, 2011

(54) DRIVING DEVICE AND DISPLAY APPARATUS HAVING THE SAME

(75) Inventor: Ho-Hyeong Lee, Gwangju (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1165 days.

(21) Appl. No.: 11/829,393

(22) Filed: Jul. 27, 2007

(65) Prior Publication Data
US 2008/0024474 A1    Jan. 31, 2008

(30) Foreign Application Priority Data
Jul. 28, 2006 (KR) .......................... 10-2006-0071625

(51) Int. Cl.
*G06F 3/038* (2006.01)
(52) U.S. Cl. .......... 345/206; 345/98; 345/100; 345/204; 345/213; 345/104
(58) Field of Classification Search .................. 345/204, 345/213, 87–104
See application file for complete search history.

(56) References Cited

U.S. PATENT DOCUMENTS

| 5,606,348 A * | 2/1997 | Chiu | 345/213 |
| 5,717,467 A * | 2/1998 | Shiki | 348/511 |
| 6,924,796 B1 * | 8/2005 | Someya et al. | 345/213 |
| 2002/0190137 A1 * | 12/2002 | Cheng | 239/128 |
| 2003/0034948 A1 * | 2/2003 | Imamura | 345/98 |
| 2005/0003780 A1 * | 1/2005 | Miyagi | 455/226.1 |

FOREIGN PATENT DOCUMENTS

| CN | 1551064 A | 12/2004 |
| KR | 1020010065766 | 7/2001 |
| KR | 1020020049446 | 6/2002 |
| KR | 1020040077011 | 9/2004 |

OTHER PUBLICATIONS

English Abstract for Publication No. CN 1551064A, Publication Date: Dec. 1, 2004.

* cited by examiner

*Primary Examiner* — Richard Hjerpe
*Assistant Examiner* — Jeffrey Steinberg
(74) *Attorney, Agent, or Firm* — F. Chau & Associates, LLC

(57) ABSTRACT

A display device includes a timing controller, a data driver and a gate driver. The timing controller receives a first clock and an image data signal and outputs a second clock having a lower frequency than that of the first clock and the image data signal. The data driver receives the image data signal in synchronization with the second clock and converts the image data signal into a pixel voltage in response to a data control signal. The gate driver outputs a gate voltage in response to a gate control signal generated based on the second clock.

14 Claims, 3 Drawing Sheets

DRIVING DEVICE AND DISPLAY APPARATUS HAVING THE SAME

CROSS-REFERENCE TO RELATED APPLICATION

This application claims priority to Korean Patent Application No. 2006-71625 filed on Jul. 28, 2006, the disclosure of which is herein incorporated by reference in its entirety.

BACKGROUND OF THE INVENTION

1. Technical Field

The present invention relates to a display device and a display apparatus having the same, and more particularly, to a driving device capable of improving a charge rate and reducing an electromagnetic interference.

2. Discussion of the Related Art

A liquid crystal display includes a liquid crystal display panel having two display substrates and a liquid crystal layer interposed between the two substrates. The liquid crystal display panel applies an electric field to the liquid crystal layer and adjusts intensity of the electric field to control transmittance of light passing through the liquid crystal layer, thereby displaying a desired image thereon.

The liquid crystal display panel is provided with a plurality of gate lines, a plurality of data lines and a plurality of pixels connected to the gate and data lines. The gate lines sequentially receive a gate voltage, and the data lines receive a pixel voltage. The pixels are turned on in a row in response to the gate voltage to apply the pixel voltage to the liquid crystal layer. When a common voltage is zero, a voltage corresponding to the pixel voltage is charged in the liquid crystal layer, to thereby tilt liquid crystal molecules of the liquid crystal layer and control the light transmittance of the liquid crystal layer.

However, according to the scaled-up size of the liquid crystal display panel, the number of pixels for the liquid crystal display panel increases. Further, when a resolution of the liquid crystal display increases, the number of pixels per square inch also increases.

Since the number of pixels increases, a time necessary to turn on the pixels in the same row is reduced, resulting in reduction of a charging time for the liquid crystal layer corresponding to the pixels arrayed in the same row.

As a result, the charge rate of the liquid crystal layer decreases, thereby causing deterioration in brightness and brightness uniformity.

SUMMARY OF THE INVENTION

Embodiments of the present invention provide a driving device capable of improving a charge rate and reducing an electromagnetic interference, and a display apparatus having the driving device.

In an exemplary embodiment of the present invention, a driving device includes a timing controller a data driver and a gate driver. The timing controller receives a first clock and a first image data signal from an external device, generates a second clock having a lower frequency than that of the first clock and a second image data signal, and outputs a data control signal and a gate control signal. The data driver receives the second image data signal in synchronization with the second clock from the timing controller and converts the second image data signal into a pixel voltage. The gate driver outputs a gate voltage in response to the gate control signal.

In an exemplary embodiment of the present invention, a display apparatus includes a timing controller, a data driver, a gate driver and a display part. The timing controller receives a first clock and a first image data signal from an external device, generates a second clock having a lower frequency than that of the first clock and a second image data signal, and outputs a data control signal and a gate control signal. The data driver receives the second image data signal in synchronization with the second clock from the timing controller and converts the second image data signal into a pixel voltage. The gate driver outputs a gate voltage in response to the gate control signal. The display part includes a plurality of data lines, a plurality of gate lines and a plurality of pixels to display an image.

According to exemplary embodiments of the present invention, the data driver outputs the pixel voltage in response to the second clock having the lower frequency than that of the first clock. Thus, a display period within one frame increases, so that an ON-time of the gate voltage is lengthened, thereby improving a charge rate of the display apparatus.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

Exemplary embodiments of the present invention are described more fully hereinafter with reference to the accompanying drawings, in which exemplary embodiments of the invention are shown. This invention may, however, be embodied in many different forms and should not be construed as limited to the embodiments set forth herein.

Figure 1:
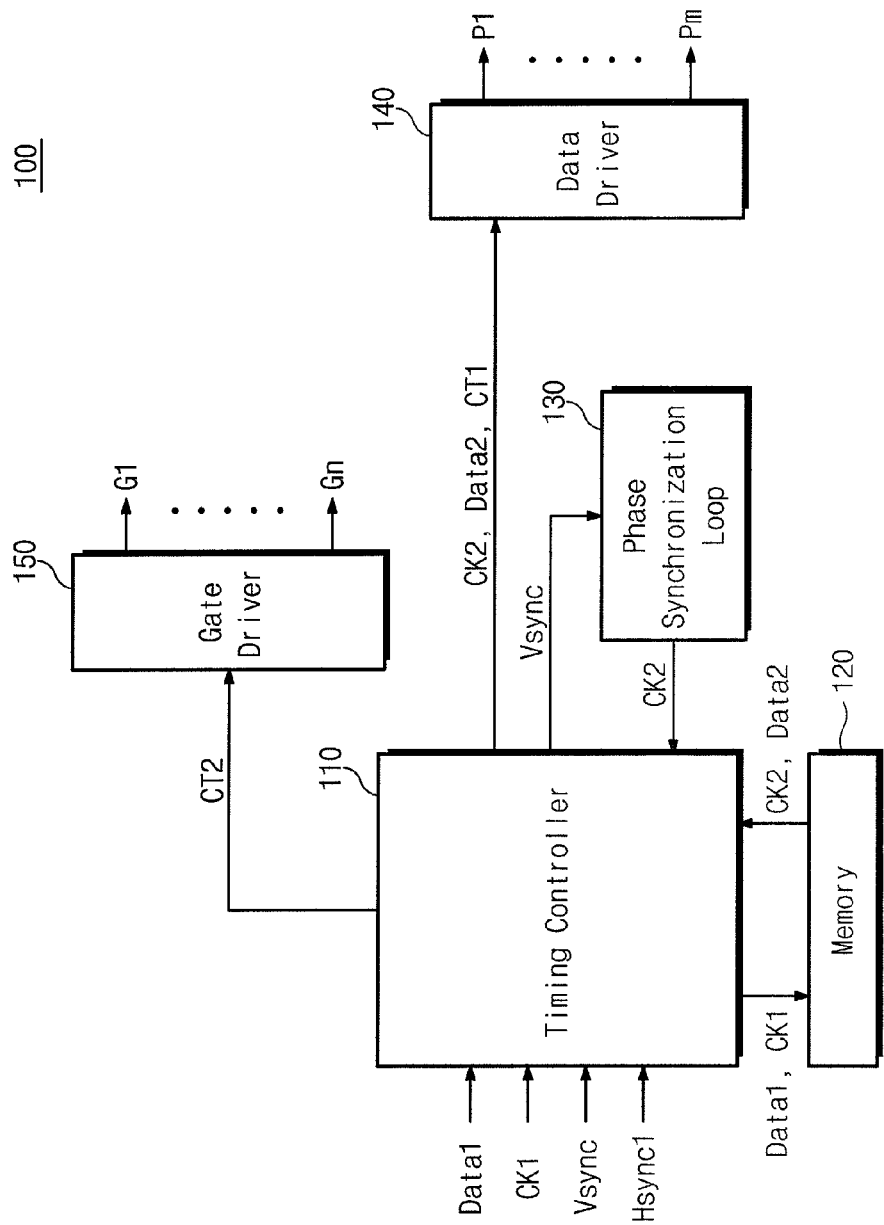
FIG. 1 is a block diagram showing a driving device according to an exemplary of the present invention.

FIG. 1 is a block diagram showing a driving device according to an exemplary embodiment of the present invention.

Referring to FIG. 1, a driving device 100 includes a timing controller 110, a memory 120, a phase synchronization loop 130, a data driver 140 and a gate driver 150.

The timing controller 110 receives a vertical synchronization signal Vsync from an external device (not shown), a first horizontal synchronization signal Hsync1, a first clock CK1 and a first image data signal Data1. In an embodiment, the timing controller 110 and the external device are communicated with each other using a low voltage differential signaling (LVDS) interface.

The timing controller 110 stores the first image data signal Data1 in the memory 120 in synchronization with the first clock CK1. The timing controller 110 applies the vertical synchronization signal Vsync to the phase synchronization loop 130 from the external device.

The phase synchronization loop 130 generates a second clock CK2 having a lower frequency than that of the first clock CK1 using the vertical synchronization signal Vsync from the timing controller 110. The second clock CK2 generated from the phase synchronization loop 130 is applied to the timing controller 110. Thus, the timing controller 110 reads out a second image data signal Data2 corresponding to one line from the memory 120 in response to the second clock CK2. Also, the timing controller 110 transmits the second image data signal Data2 read out from the memory 120 to the data driver 140. In an embodiment, the timing controller 110 and the data driver 140 are communicated with each other using a reduced swing differential signaling (RSDS) interface.

Responsive to the second clock CK2, the timing controller 110 converts the first horizontal synchronization signal Hsync1 into a second horizontal synchronization signal (not shown) having a lower frequency than that of the first horizontal synchronization signal Hsync1. Further, the timing controller 110 generates a data control signal CT1 and a gate control signal CT2 based on the vertical synchronization signal Vsync and the second horizontal synchronization signal, respectively.

The data driver 140 receives the second image data signal Data2 from the timing controller 110 and converts the second image data signal Data2 into pixel voltages P1 to Pm in response to the data control signal CT1. The gate driver 150 sequentially outputs first to n-th gate voltages G1 to Gm in response to the gate control signal CT2 from the timing controller 110.

When the timing controller 110 communicates with the data driver 140 using a clock having a same frequency as that of the first clock CK1 that is used for the communication between the timing controller 110 and the external device, electromagnetic interference (EMI) is focused on a specific frequency used for both communications between the timing controller 110 and the external device and between the timing controller 110 and the data driver 140. However, the data communication between the timing controller 110 and the data driver 140 is performed using the second clock CK2 having a different frequency from that of the first clock CK1 as shown in FIG. 1, thereby dispersing the EMI.

Figure 2:
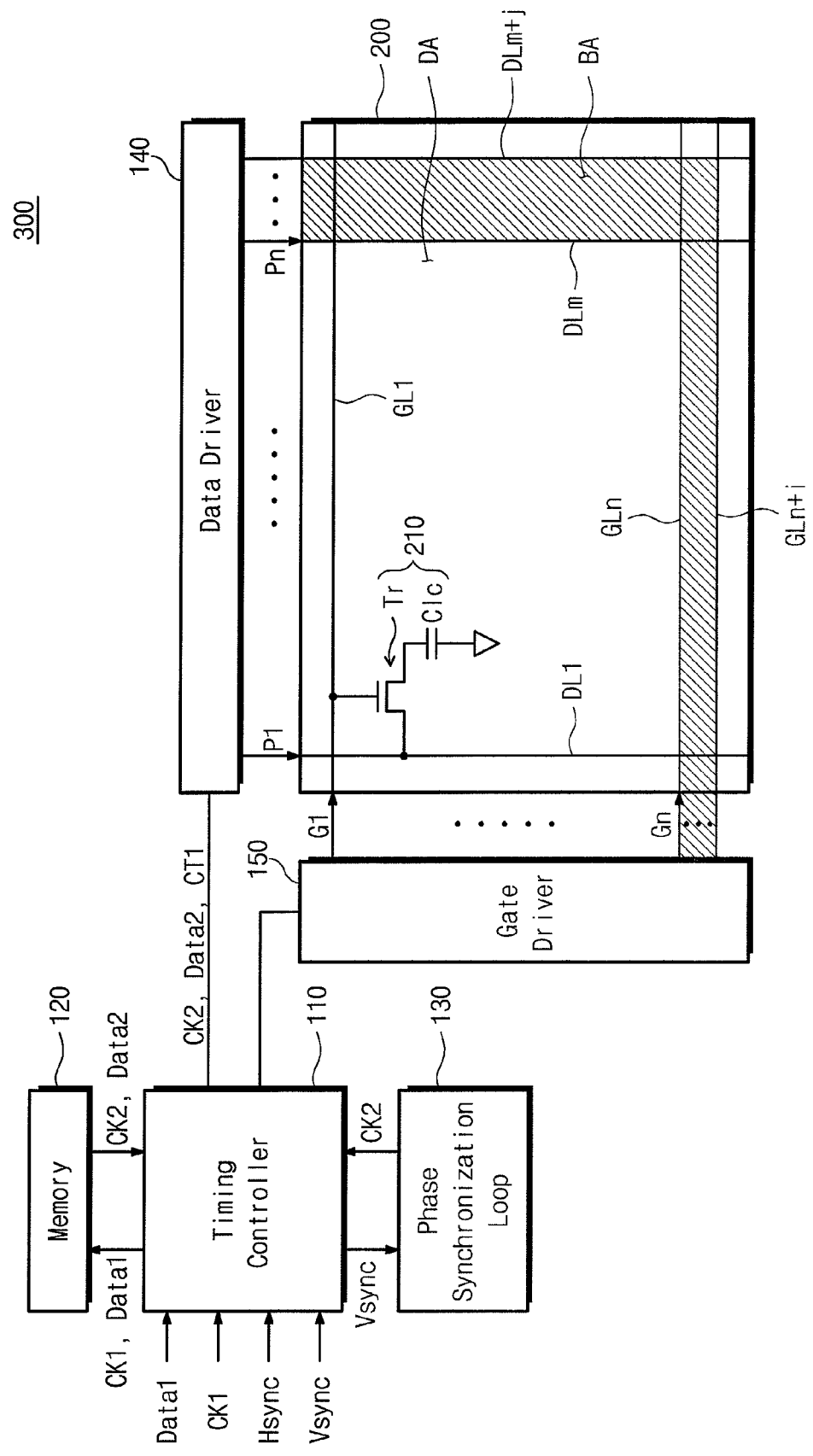
FIG. 2 is a block diagram showing a liquid crystal display having the driving device shown in FIG. 1 according to an exemplary embodiment of the present invention.

FIG. 2 is a block diagram showing a liquid crystal display having the driving device shown in FIG. 1 according to an exemplary embodiment of the present invention.

Referring to FIG. 2, a liquid crystal display 300 includes a display part 200 to display an image and the driving device 100 to drive the display part 200.

The display part 200 includes first to (n+i)th gate lines GL1 to GLn+i and first to (m+j)th data lines DL1 to DLm+j that are insulated from and intersect with the first to (n+i)th gate lines GL1 to GLn+i. The display part 200 can be divided into a display area DA on which the image is displayed and a blanking area BA adjacent to the display area DA. The first to n-th gate lines GL1 to GLn and the first to m-th data lines DL1 to DLm are formed in the display area DA, and the (n+1)th to (n+i)th gate lines GLn+1 to GLn+i and the (n+1)th to (n+j)th data lines DLn+1 to DLm+j are formed in the blanking area BA. In an embodiment, the first to n-th gate lines GL1 to GLn and the first to m-th data lines DL1 to DLm are defined as effective gate lines and effective data lines, respectively.

In the display area DA, effective pixel areas are defined in a matrix by the effective gate lines and the effective data lines, and an effective pixel 210 is formed in each effective pixel area. The effective pixel 210 includes a thin film transistor Tr and a liquid crystal capacitor Clc.

In the blanking area BA, non-effective pixel areas are defined by the (n+1)th to (n+i)th gate lines GLn+1 to GLn+i and the (m+1)th to (m+j)th data lines DLm+1 to DLm+j, and a non-effective pixel (not shown) is formed in each non-effective pixel areas. Any signal may not be applied to the non-effective pixel.

In an embodiment, when the total number of gate lines formed on the display part 200 is 838 lines, the number of effective gate lines is 768 lines corresponding to 91.6% of the total number of gate lines. Also, when the total number of data lines formed on the display part 200 is 1600 lines, the number of effective data lines is 1366 lines corresponding to 85.4% of the total number of data lines. As a result, the display area DA corresponds to 78.2% of the display part 200.

The driving device 100 includes the timing controller 110, the memory 120, the phase synchronization loop 130, the data driver 140 and the gate driver 150.

The phase synchronization loop 130 generates the second clock CK2 having the lower frequency than that of the first clock CK1 using the vertical synchronization signal Vsync from the timing controller 110 and applies the second clock CK2 to the timing controller 110. The timing controller 110 transmits the second image data signal Data2 to the data driver 140 in synchronization with the second clock CK2.

In an embodiment, the frequency of the second clock CK2 is obtained by multiplying the frequency of the vertical synchronization signal Vsync by the number of the effective data lines DL1 to DLm and again by the number of the effective gate lines GL1 to GLn. When the frequency of the vertical synchronization signal Vsync is 60 Hz, the number of the effective gate lines GL1 to GLn is 768 lines and the number of the data lines DL1 to DLm is 1366 lines, the second clock CK2 has the frequency of about 62.98 MHz.

The data driver 140 receives the second image data Data2 from the timing controller 110 and converts the second image data Data2 into the pixel voltages P1 to Pm in response to the data control signal CT1. The pixel voltages P1 to Pm outputted from the data driver 140 are applied to the effective data lines DL1 to DLm, respectively. In an embodiment, the data control signal CT1 is generated based on the vertical synchronization signal Vsync.

The gate driver 150 sequentially outputs the first to n-th gate voltages G1 to Gn in response to the gate control signal CT2 from the timing controller 110. The first to n-th gate voltages G1 to Gn outputted from the gate driver 150 are sequentially applied to the effective gate lines GL1 to GLn.

The timing controller 110 converts the first horizontal synchronization signal Hsync1 into the second horizontal synchronization signal having the lower frequency than that of the first horizontal synchronization signal Hsync1. Particularly, the frequency of the second horizontal synchronization signal is obtained by multiplying the frequency of the vertical synchronization signal Vsync by the number of the effective gate lines GL1 to GLn. When the frequency of the vertical synchronization signal Vsync is 60 Hz and the number of the effective gate lines GL1 to GLn is 768 lines, the second horizontal synchronization signal has a frequency of about 46.08 KHz.

The timing controller 110 outputs the gate control signal CT2 based on the second horizontal synchronization signal, and the gate driver 150 generates the first to n-th gate voltages G1 to Gn based on the gate control signal CT2. Thus, each of the first to n-th gate voltages G1 to Gn has an ON-time defined by dividing one (1) by the frequency of the second horizontal synchronization signal. That is, since the second horizontal synchronization signal has the frequency of about 46.08 KHz, each of the first to n-th gate voltages G1 to Gn has the ON-time of about 21.7 microseconds.

The frequency of the first horizontal synchronization signal Hsync1 is obtained by multiplying the frequency of the vertical synchronization signal Vsync by the number of the gate lines GL1 to GLn+i. Thus, when the frequency of the vertical synchronization signal Vsync is 60 Hz and the number of the gate lines GL1 to GLn+i is 838 lines, the first horizontal synchronization signal Hsync1 has a frequency of about 50.28 KHz higher than that of the second horizontal synchronization signal. When the gate driver 150 generates the first to n-th gate voltages G1 to Gn based on the first horizontal synchronization signal Hsync1, each of the first to n-th gate voltages G1 to Gn has the ON-time of about 19.89 microseconds. That is, the ON-time of each gate voltage increases about 1.8 microseconds.

Thus, when the data driver 140 receives the second image data signal Data2 in synchronization with the second clock CK2 generated based on the effective gate lines GL1 to GLn and the effective data lines DL1 to DLm, a display period where the display part 200 is turned on extends within one frame. Further, when the gate driver 150 outputs the first to n-th gate voltages G1 to Gn in response to the second horizontal synchronization signal generated based on the effective gate lines GL1 to GLn, the ON-time of the first to n-th gate voltages G1 to Gn outputted from the gate driver 150 increases. Thus, a time that is necessary to charge one pixel increases, thereby improving a charge rate of the display apparatus 300.

Figure 3:
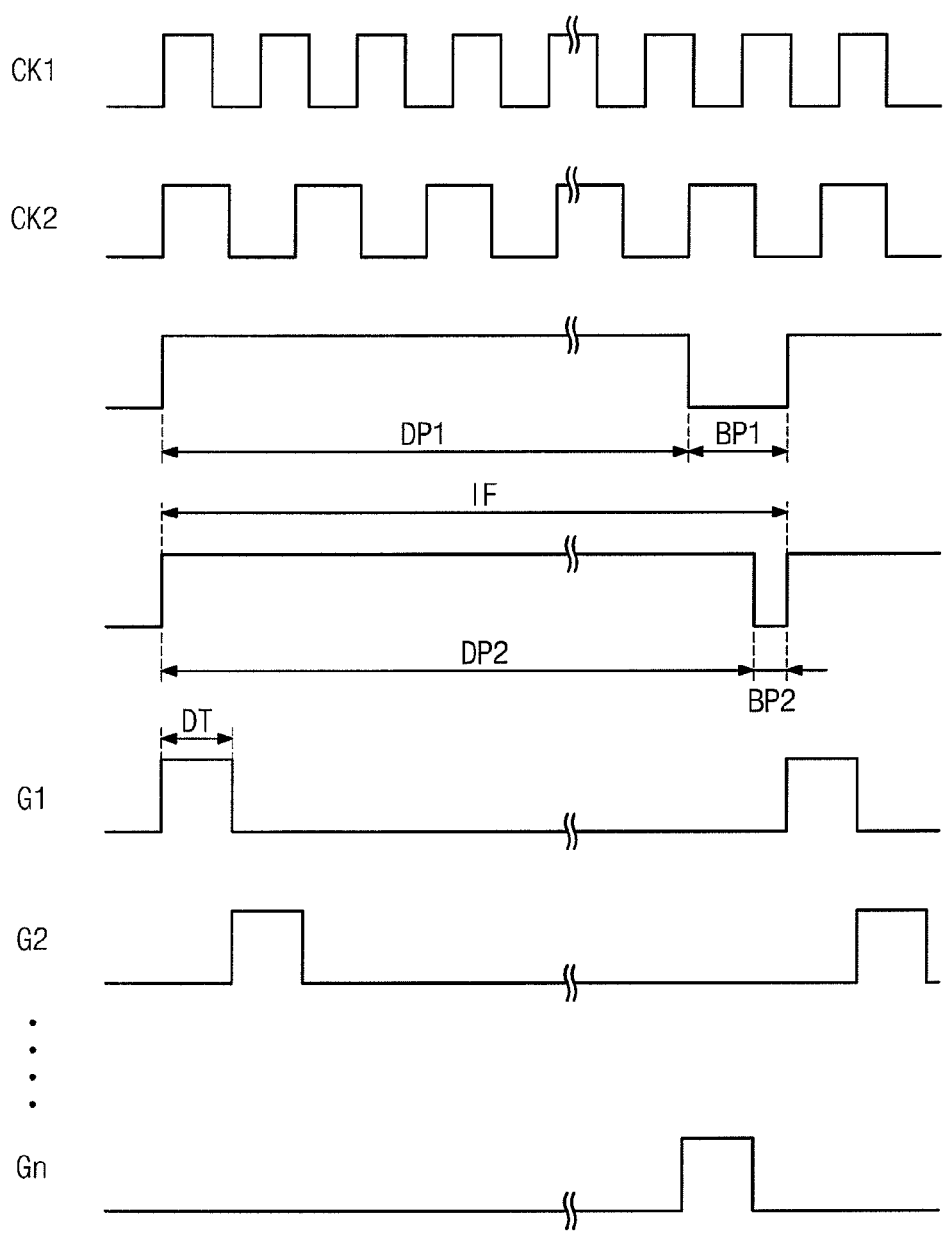
FIG. 3 is a wavelength diagram illustrating various signals of FIG. 2.

FIG. 3 is a wavelength diagram illustrating various signals of FIG. 2.

Referring to FIG. 3, the second clock CK2 has the lower frequency than that of the first clock CK1. Thus, the second clock CK2 has a period T2 longer than a period T1 of the first clock CK1.

In FIG. 3, a first display period DP1 is defined by a period during which the data driver 140 (shown in FIG. 2) outputs the pixel voltages P1 to Pm (shown in FIG. 2) in synchronization with the first clock CK1 within a frame 1F. A first blank period BP1 corresponds to a period during which the data driver 140 does not output the pixel voltages P1 to Pm and is defined by subtracting the first display period DP1 from the frame 1F.

Meanwhile, a second display period DP2 is defined by a period during which the data driver 140 outputs the pixel voltages P1 to Pm in synchronization with the second clock CK2 within the frame 1F. A second blank period BP2 corresponds to a period during which the data driver 140 does not output the pixel voltages P1 to Pm and is defined by subtracting the second display period DP2 from the frame 1F.

In an embodiment, since the second clock CK2 has the lower frequency than that of the first clock CK1, the second display period DP2 is lengthened than the first display period DP1, and the second blank period BP2 is shortened than the first blank period BP1 by the length difference between the first and second display periods DP1 and DP2.

The gate driver 150 (shown in FIG. 2) sequentially outputs the first to n-th gate voltages G1 to Gn during the second display period DP2. Also, since the second display period DP2 is lengthen, the ON-time of the first to n-th gate voltages increases. Thus, the time necessary to charge the pixel increases, thereby improving the charge rate of the display apparatus 300 (shown in FIG. 2).

According to exemplary embodiments of the present invention, the second clock CK2 applied to the data driver has the lower frequency than that of the first clock CK1, so that the display period may be lengthened within the frame 1F.

Accordingly, the ON-time of the gate voltages sequentially outputted from the gate driver increases within the frame, to thereby improve the charge rate of the display apparatus.

Further, the second clock used for the communication between the timing controller and the data driver, thereby preventing the EMI from being focused on the specific frequency and reducing the EMI of the display apparatus.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A driving device comprising:
    a timing controller receiving a first clock, a vertical synchronization signal, and a first image data signal, generating a second clock having a lower frequency than a frequency of the first clock from the vertical synchronization signal and a second image data signal, and outputting a data control signal and a gate control signal;
    a data driver receiving the second image data signal in synchronization with the second clock from the timing controller, the data driver converting the second image data signal into a pixel voltage; and
    a gate driver outputting a gate voltage in response to the gate control signal.

2. The driving device of claim 1, further comprising a phase synchronization loop generating from the vertical synchronization signal the second clock having the lower frequency than the frequency of the first clock by a predetermined value, the phase synchronization loop applying the second clock to the timing controller.

3. The driving device of claim 2, wherein the timing controller receives a first horizontal synchronization signal, applies the vertical synchronization signal to the phase synchronization loop, and generates a second horizontal synchronization signal having a lower frequency than a frequency of the first horizontal synchronization signal in response to the second clock from the phase synchronization loop.

4. The driving device of claim 3, wherein the timing controller generates the data control signal and the gate control signal in response to the vertical synchronization signal and the second horizontal synchronization signal, respectively.

5. The driving device of claim 1, further comprising a memory storing the first image data signal, wherein the timing controller stores the first image data signal in the memory in response to the first clock and reads out the first image data signal from the memory as the second image data signal in response to the second clock.

6. A display apparatus comprising:
    a timing controller receiving a first clock, a vertical synchronization signal, and a first image data signal, generating a second clock having a lower frequency than a frequency of the first clock from the vertical synchronization signal and a second image data signal, and outputting a data control signal and a gate control signal;
    a data driver receiving the second image data signal in synchronization with the second clock from the timing controller, the data driver converting the second image data signal into a pixel voltage;
    a gate driver outputting a gate voltage in response to the gate control signal; and
    a display part displaying an image, the display part including a plurality of data lines, a plurality of gate lines and a plurality of pixels.

7. The display apparatus of claim 6, further comprising a phase synchronization loop generating from the vertical synchronization signal the second clock having the lower frequency than the frequency of the first clock by a predetermined value, the phase synchronization loop applying the second clock to the timing controller.

8. The display apparatus of claim 7, wherein the timing controller receives a first horizontal synchronization signal, applies the vertical synchronization signal to the phase synchronization loop, and generates a second horizontal synchronization signal having a lower frequency than a frequency of the first horizontal synchronization signal in response to the second clock from the phase synchronization loop.

9. The display apparatus of claim 8, wherein
the data lines comprises effective data lines to which the pixel voltage is applied and non-effective data lines to which the pixel voltage is not applied,
the gate lines comprises effective gate lines to which the gate voltage is sequentially applied and non-effective gate lines to which the gate voltage is not applied, and
the pixels comprises effective pixels charging the pixel voltage in response to the gate voltage and non-effective pixels to which the pixel voltage is not applied.

10. The display apparatus of claim 9, wherein the frequency of the second clock is obtained by multiplying a frequency of the vertical synchronization signal by a number of the effective data lines and by a number of the effective gate lines.

11. The display apparatus of claim 10, wherein
the frequency of the vertical synchronization signal is 60 Hz, and
the frequency of the second horizontal synchronization signal is obtained by multiplying the frequency of the vertical synchronization signal by the number of the effective gate lines.

12. The display apparatus of claim 8, wherein the timing controller generates the data control signal and the gate control signal in response to the vertical synchronization signal and the second horizontal synchronization signal, respectively.

13. The display apparatus of claim 12, wherein an ON-time of the gate voltage is defined by dividing 1 by the frequency of the second horizontal synchronization signal.

14. The display apparatus of claim 6, further comprising a memory storing the first image data signal therein, wherein the timing controller stores the first image data signal in the memory in response to the first clock and reads out the first image data signal from the memory as the second image data signal in response to the second clock.

* * * * *